Figure 1:
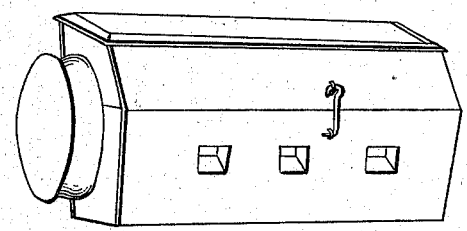
Figure 2:
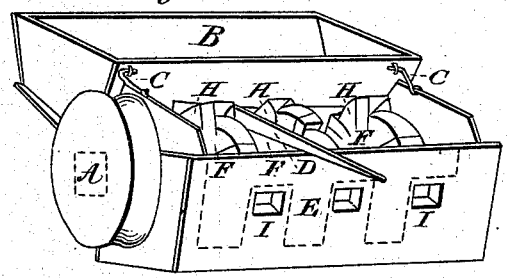
Figure 3:
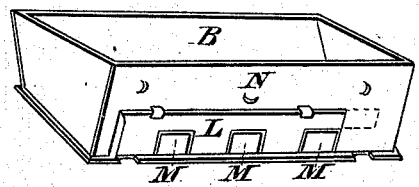
Figure 4:
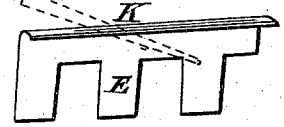
Figure 5:
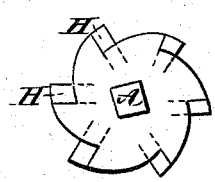

C. H. COWLES.
Seed Dropper.

No. 103,022.

Patented May 17, 1870.

Witnesses:
Jno. D. Patten
Alonzo Hughes

Inventor:
Charles H. Cowles
Per A. A. Bradford
Atty

United States Patent Office.

CHARLES H. COWLES, OF NEBRASKA CITY, NEBRASKA.

Letters Patent No. 103,022, dated May 17, 1870.

IMPROVEMENT IN SEEDING-MACHINES.

The Schedule referred to in these Letters Patent and making part of the same.

*To all whom it may concern:*

Be it known that I, CHARLES H. COWLES, of Nebraska City, in the county of Otoe and State of Nebraska, have invented a new and useful Improved Machine for Planting Grain of all kinds, called the "Eureka Seeder;" and I do hereby declare that the following is a full, clear, and exact description of the construction and operation of the same, reference being had to the annexed drawings making a part of this specification, in which—

Figure I is a perspective view.
Figure II a longitudinal elevation.
Figure III a transverse section.

The nature of my invention consists in providing a machine containing bucket-wheels revolving inside a grain-box, by which all kinds of grain may be sown, notwithstanding the condition of the grain; and the machine cannot be choked up by dirt that may be in the grain.

Letter A represents the shaft that revolves in the grain-box F, and upon which shaft is attached the bucket-wheel H, which takes up the grain coming from the feed-box B, and carries the grain to the openings I, and is thence scattered on the ground.

D represents a lever, by which the feed is regulated.

C C represent two hooks that hold the feed-box in its proper position. The lever D is attached to a slide regulating the feed, by means of the hook C.

To enable others skilled in the art to make and use my invention, I will proceed to describe its construction and operation.

The Eureka machine may be made of any desirable length or size. In the one I used in putting in my wheat on corn ground, without cutting or removing the stalks, each box was eight inches at the top; the front of each box seven inches—the back five and a-half inches deep. When in working position five wood wheels, one and a quarter inch face, six inches diameter, each wheel having eight cups or elevators, made of zinc or sheet-iron, one inch wide, about four inches long, bent over the verge of the wheels, and fastened to the side with tacks, the wheel being cut so as to form a cup one and one-fourth by three-fourths, and three-fourths of an inch deep. These wheels are fastened on three-fourth-inch bar-iron shaft, equal distances, so as to carry the grain over, and to discharge through holes in the lower box, one and one-fourth by one and one-half inch, made opposite their center, in front.

The quantity is regulated by sheet-iron slides on the inside, fastened to a hoop-iron slide on the top edge of the front box, and moved by a lever-hook into a staple in the top box, and extending back to within convenient reach of the driver, the box setting forward of the axle-tree, so as to scatter the grain forward of the shovels, turned by a wheel on the end of the shaft.

The wheel is one and one-fourth inch face by eight inches in diameter, the band passing from it around a wheel one and one-fourth inch face by ten inches in diameter, which is fastened with the spokes around the hub; a round band crossed so as to feed facing the driver.

When in use, the bottom of the front of one box sits on the top of the back edge of the other, fastened by hooks at the end, and supplies the lower one, keeping it at a uniform fullness through slide-gates opposite each wheel in the bottom of the side of the top box. These may be made two or three inches square; the grain regulated by sheet-iron slides on the outside.

I prefer the slides to move up and down instead of horizontally. The top box turns over and forms a cover for the lower one. When not in use it deposits grass-seed, and all kinds of small grain, including corn, with most unerring certainty, and never chokes or clogs, even though the seed be dirty.

What I claim as my invention is—

1. The combination and arrangement of feed-box B and grain-box F, whereby the latter is kept at a uniform fullness, as described.

2. The shaft A, with bucket-wheels H, constructed substantially as described, and revolving in grain-box F in continuation with openings I.

3. The combination of feed-box B, grain-box F, feed-regulating slides, shaft A, bucket-wheels H and lever D, all constructed and operating substantially as described.

CHARLES H. COWLES.

Witnesses:
C. W. SEYMOUR,
A. A. BRADFORD.